Jan. 18, 1966     H. R. KAISER     3,230,449
APPARATUS FOR DIRECT MEASUREMENT OF CAPACITANCE
AND DISSIPATION FACTOR OF CAPACITORS
Filed Oct. 2, 1961     3 Sheets-Sheet 1

INVENTOR.
HAROLD R. KAISER
BY
Agent

INVENTOR.
HAROLD R. KAISER
BY
Agent

INVENTOR.
HAROLD R. KAISER

United States Patent Office 3,230,449
Patented Jan. 18, 1966

3,230,449
APPARATUS FOR DIRECT MEASUREMENT OF CAPACITANCE AND DISSIPATION FACTOR OF CAPACITORS
Harold R. Kaiser, Los Altos, Calif., assignor to Lockheed Aircraft Corporation, Burbank, Calif.
Filed Oct. 2, 1961, Ser. No. 142,062
5 Claims. (Cl. 324—60)

This invention relates to measuring the capacitance and dissipation factor of a capacitor and more particularly to making such measurements continuously as the capacitor is being electrolytically formed.

Since the development of processes for forming capacitors by anodizing a piece of base metal in a bath, such as described in commonly assigned co-pending U.S. patent application Serial Number 55,089, filed September 9, 1960, it has become desirable to continuously measure the capacitance and dissipation factor of a capacitor while it is being formed. Because the capacitance and the dissipation factor of the capacitor vary as the anodizing proceeds, conventional bridge methods which require manual balancing to a null point cannot be used.

Therefore, it is an object of my invention to provide apparatus for continuously measuring the capacitance of a capacitor as the capacitance varies.

Another object of my invention is to provide apparatus for continuously measuring the dissipation factor of a capacitor as the dissipation factor varies.

Still another object is to provide apparatus for continuously measuring the capacitance and dissipation factor of a capacitor as the capacitor is being formed by anodization in a conductive bath.

A further object is to provide apparatus for measuring the capacitance and dissipation factor of a capacitor while it is being formed by an anodization process without interfering with the anodization process.

These and other objects will be more apparent after referring to the following specification and the attached drawings in which.

Figure 1:
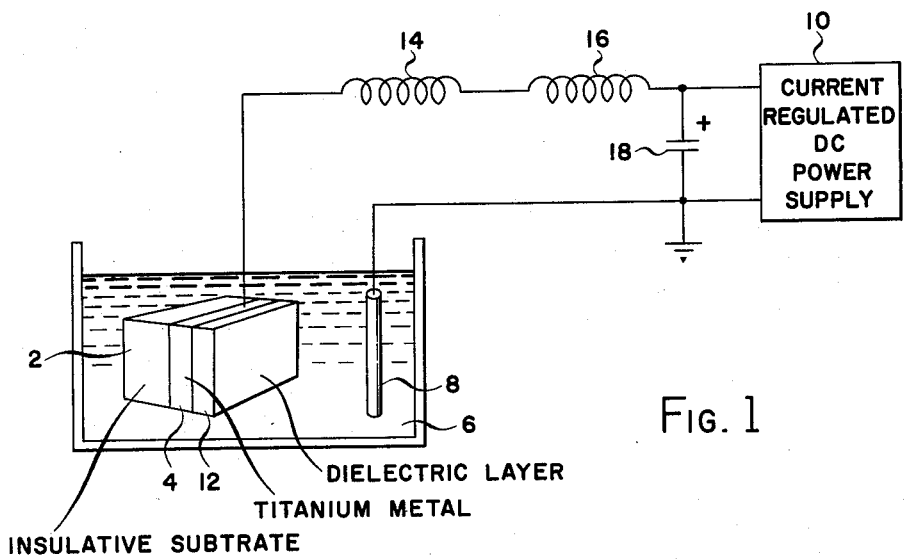
FIGURE 1 is a view of the dielectric layer for a capacitor being formed by anodization in a bath.
Figure 2:
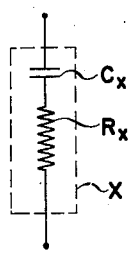
FIGURE 2 is the equivalent circuit of the capacitor of FIGURE 1 for a fixed frequency.
Figure 3:
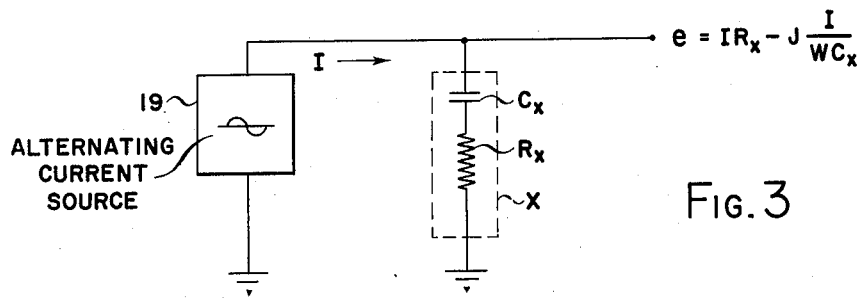
FIGURE 3 is a block diagram for demonstrating the principle of operation of my invention.

Referring more particularly to the drawings, reference numeral 2 indicates an insulative substrate such as alumina on which has been deposited a layer of titanium metal 4. The thickness of substrate 2 and layer 4 are exaggerated for clarity. Substrate 2 and metallic layer 4 are suspended into a bath 6 constituted as described in the above-cited co-pending patent application. Also suspended in the bath 6 is an electrode 8 which may be of any suitable material, for example, platinum. A current-regulated D.C. power supply 10 is provided for furnishing the required anodizing current which flows from titanium layer 4 to electrode 8. As the current flows from titanium layer 4 a layer of titanium dioxide 12 is formed on the surface thereof and possesses the dielectric properties necessary for constructing a capacitor. A filter circuit including inductances 14 and 16 and capacitor 18 is provided between power source 10 and bath 6 so as to prevent alternating current from flowing therebetween. Because power source 10 is current regulated and because inductors 14 and 16 and capacitor 18 are provided for filtering, the elements just referred to present virtually infinite impedance to alternating current between titanium layer 4 and electrode 8. As anodizing proceeds a dielectric layer 12 builds up on titanium layer 4 and a capacitor is formed in which titanium layer 4 forms one plate, the titanium dioxide layer 12 forms the dielectric layer and the conductive bath 6 forms the opposite plate. As is well known by those skilled in the art, such capacitor, denominated $x$ in FIGURE 2, when considered at a single frequency is equivalent to an ideal capacitor $C_x$ in series with a resistor $R_x$. Referring now to FIGURE 3, capacitor $x$ is shown connected in the measuring circuit of my invention with the anodizing current circuit deleted since such circuit offers virtually infinite impedance to the alternating current measuring signal. An alternating current source 19 of the type wherein the current output is independent of the load impedance causes a constant current I to flow through the capacitor $x$. The voltage across capacitor $x$ can be described by the following relationship:

$$e_x = IR_x = j\frac{I}{wC_x} \tag{1}$$

If the quadrature component of this voltage is maintained constant, i.e.

$$\frac{I}{wC_x} = K \tag{2}$$

the current I will vary in accordance with the capacitance $C_x$, if the frequency $w$ is held constant, which from Equation 2 may be expressed as follows:

$$I = KwC_x \tag{3}$$

From Equation 1 it may be seen that the real or in-phase component of the voltage $e_x$ is equal to $IR_x$, and when the value of I as given in Equation 3 is substituted therein the following relationship holds:

$$e_x(\text{real}) = IR_x = KwC_xR_x \tag{4}$$

Thus, because the dissipation factor, $$D_x = wC_xR_x \tag{5}$$

the real part of the voltage $e_x$ will be proportional to the dissipation factor $D_x$.

Figure 4:
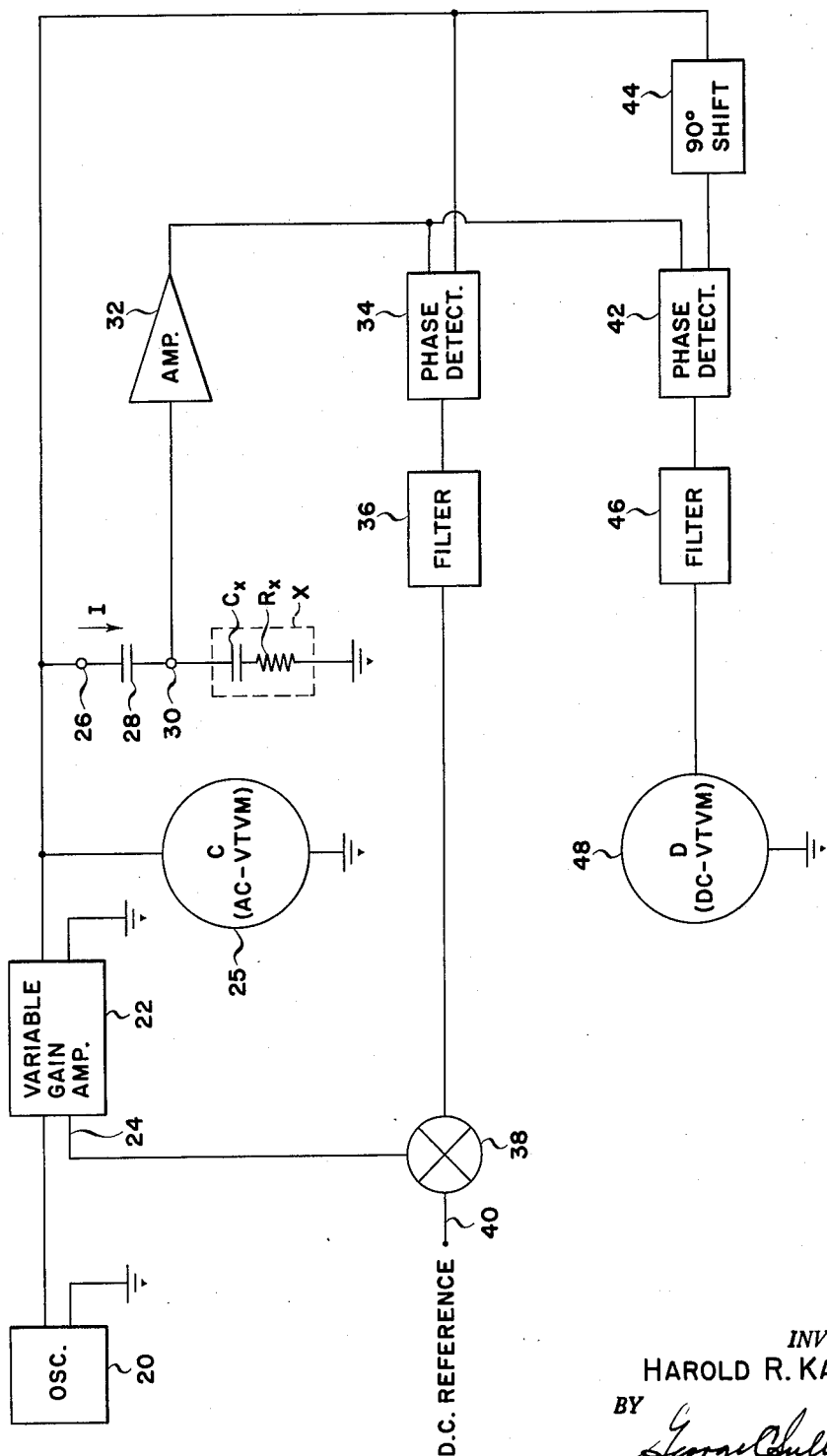
FIGURE 4 is a detailed block diagram of the preferred embodiment of my invention.
Figure 5:
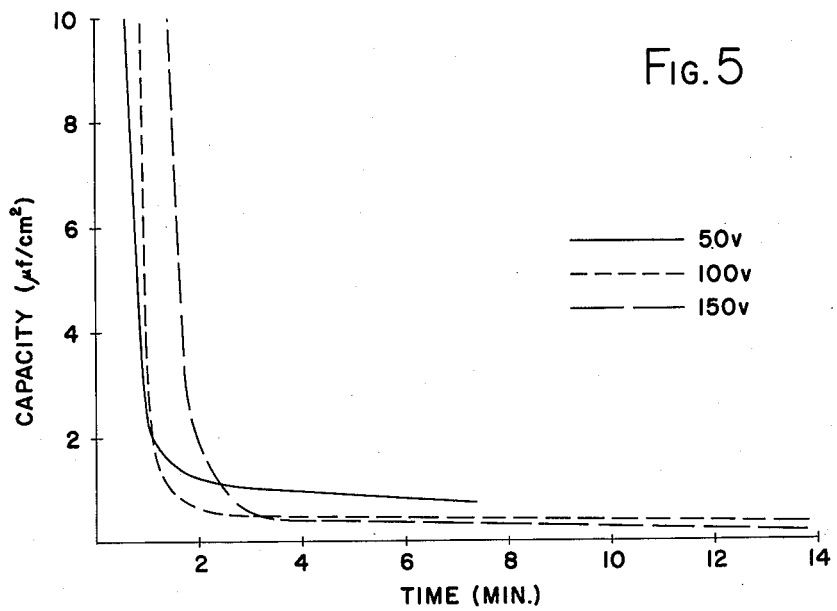
FIGURE 5 is a graph of capacitance versus time measured in accordance with my invention during the formation of a capacitor.
Figure 6:
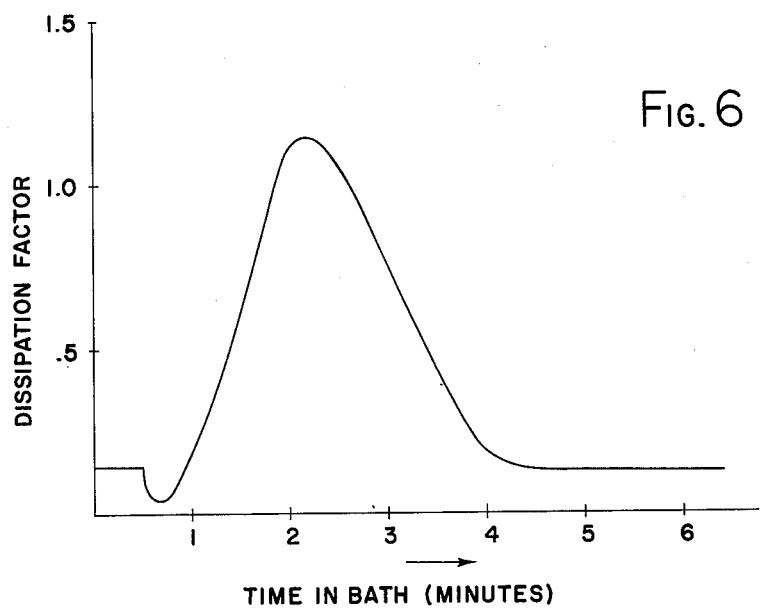
FIGURE 6 is a graph of dissipation factor versus time measured in accordance with my invention during the formation of a capacitor by anodization.

I obtain the above measurements by the circuit of FIGURE 4, in which a conventional oscillator 20 provides the measuring signal for my apparatus and produces an A.-C. signal having a frequency whose period is very short with respect to the time required to form a capacitor in bath 6. Since it takes approximately 5 to 10 minutes to so form a capacitor, a frequency of 1000 cycles per second for oscillator 20 is quite satisfactory. The output of oscillator 20 is connected to the input of a conventional variable gain amplifier 22, the amplitude of the output of which is controlled by the impression of a direct current signal on control terminal 24 and is continuously measured by a conventional A.-C. VTVM 25 to ground. The output of amplifier 22 is connected to one terminal 26 of a standard capacitor 28 which also has a terminal 30 to which is connected one terminal of the capacitor $x$ under measurement, such as titanium layer 4. Capacitor 28 has a dielectric with a very low dissipation factor (e.g., mica) such that the voltage across it and the current through it are substantially 90° out of phase. The capacitance of capacitor 28 is chosen so that it is very small as compared to the capacitance $C_x$ with the result that the current I through capacitor $x$ will be substantially independent of variation in the value of capacitor $x$. In other words, oscillator 20 in series with the high impedance of capacitor 28 acts as a constant current source.

The other terminal of capacitor $x$, i.e., the electrode 8, may be connected to ground. Connected to terminal 30 is the input of a conventional voltage amplifier 32 having its output connected to one input of a phase sensitive detector 34. To the other input terminal of phase sensitive detector 34 is connected the output of amplifier 22 which output serves as a reference signal. Phase sensitive detector 34 is a conventional circuit and is arranged to pass only that portion of the signal from amplifier 32 which is in phase with the signal from amplifier 22. The output of phase sensitive detector 34 is fed to a conventional filter circuit 36 which may be a capacitor to ground, and thence to a conventional comparator circuit 38. Also fed into comparator 38 is a D.-C. reference signal 40 which may be produced by any suitable means, such as a battery. The output of comparator 38 is a direct current signal whose level is proportional to the difference between the level of D.-C. reference signal 40 and the output of filter 36 and is connected to terminal 24 of amplifier 22. The output of amplifier 22 is also connected to a phase sensitive detector 42 through a phase shift amplifier 44 which effects a 90° phase shift in the output signal of amplifier 22. Also connected to the input of phase sensitive detector 42 is the output of amplifier 32. Phase sensitive detector 42 is so arranged that its output will be proportional to that portion of the output of amplifier 32 which is 90° out of phase with the output of amplifier 22 (i.e., in phase with the current I). The output of phase detector 42 is connected to the input of the filter 46 which may be a capacitor to ground, and thence to a D.-C. voltmeter 48 which is calibrated in terms of dissipation factor D.

The operation of my device is as follows: with oscillator 20 supplying a constant frequency alternating current signal through amplifier 22, a current I is caused to flow through capacitor 28 and capacitor $x$ to ground. Because capacitor 28 has a negligible dissipation factor as compared with the dissipation factor of capacitor $x$ and a high impedance as compared to the impedance of capacitor $x$, the current I will be substantially 90° out of phase with the voltage across terminal 26 and ground. In order to make this current proportional to the capacitance $C_x$ of capacitor $x$, I maintain constant the portion of the voltage at terminal 30 which is in phase with the voltage at terminal 26 (i.e., 90° out of phase with the current I) by amplifying the voltage at terminal 30 with amplifier 32 and comparing that in-phase portion of the voltage with D.-C. reference signal 40. The difference between these two signals appears at the output of comparator 38 and modifies the gain of amplifier 22 when it is fed into terminal 24. Thus, if the in-phase portion of the voltage at terminal 30 should tend to increase, an error voltage will appear at the output of comparator 38 and will cause the gain of amplifier 22 to be decreased thereby restoring the in-phase votlage at terminal 30 to the desired value. When the in-phase voltage at termianl 30 reaches the desired value no error signal appears at the output of comparator 38. Thus, as anodizing proceeds, capacitance $C_x$ and resistor $R_x$ vary so as to alter the impedance to the current I and, since the in-phase voltage at terminal 30 is maintained constant, the current through capacitor 28 will change in accordance with changes in the capacitance $C_x$. Therefore meter 25 indicates an A.-C. voltage which is proportional to the current I of Equation 3. Therefore the reading of meter 25 is proportional to the capacitance $C_x$.

The component of the voltage of the terminal 30 which is 90° out of phase with the voltage at terminal 26 is also in phase with the current I. A signal proportional to that component appears at the output of phase-sensitive detector 42. As indicated in the Equations 4 and 5 above, this voltage is proportional to the dissipation factor $D_x$ which is continuously indicated on the meter 48.

To summarize, that component of the voltage across capacitor $x$ which is in quadrature with the current I is maintained constant so that the current is proportional to the capacitance $C_x$ which is measured as a voltage at terminal 26. The dissipation factor of capacitor $x$ is proportional to the in-phase component of the voltage at terminal 30 and is measured by meter 48.

While one embodiment of my invention has been shown and described, it will be apparent that other adaptations and modifications may be made without departing from the scope of the following claims.

I claim as my invention:

1. Apparatus for continuously measuring the capacitance of a capacitor comprising an alternating current power source having an output current substantially independent of an impedance load created by the capacitor under measurement, means for controllably varying the output current of said source, means for connecting said power source to the capacitor under measurement, means for detecting that portion of the voltage across the capacitor which is 90° out of phase with the current through the capacitor, a direct current source, feedback means connected to the output of said detecting means and said current varying means for comparing the output signal therefrom with an independent direct current reference signal applied thereto supplied from a direct current source connected to said feedback means between said detecting means and said current varying means and for applying any error signal to said current varying means to maintain constant the quadrature component of the voltage across the capacitor, and means for measuring the current through the said capacitor which is in phase with the quadrature component of the voltage thereacross.

2. Apparatus for continuously measuring concurrently the capacitance and dissipation factor of a capacitor comprising an alternating current power source having an output current substantially independent of an impedance load created by the capacitor under measurement, means for controllably varying the current output of said power source, means for connecting said power source to the capacitor under measurement, first means for detecting that portion of the voltage across the capacitor which is 90° out of phase with the current through the capacitor, a direct current source, feedback means connected to the output of said first detecting means and said current varying means for comparing the output signal from said first detecting means with an independent direct current reference signal applied thereto supplied from a direct current source connected to said feedback means between said detecting means and said current varying means and for applying any error signal generated by the comparison to said current varying means to maintain constant the quadrature component of the voltage across the capacitor, second means for detecting the quadrature component of the voltage which is in phase with the current through said capacitor, means responsive to said second detecting means for measuring the output signal thereof to thereby provide a direct reading which is proportional to the dissipation factor of said capacitor, and means for measuring the current through said capacitor to thereby provide a direct reading of the capacitor of said capacitor.

3. Apparatus for continuously measuring the capacitance of a capacitor being formed by anodization in a conductive bath which constitutes a load to the apparatus comprising an oscillator as an alternating power source having an output substantially independent of the current drawn by the capacitor being formed, amplifier means connected in series with said power source for controllably varying the current output thereof, means including a high impedance capacitor standard connecting said capacitor under measurement in series with said power source and said amplifier means, said series-connected capacitor standard, power source and amplifier means forming a constant current generator for said capacitor being formed, detector means for measuring the magnitude of the voltage component across said capacitor being formed which is 90° out of phase with the current through said capacitor, a direct current source, a feedback circuit including series-connected filter and comparator circuits connected between said detecting means and said current varying means, said feedback circuit being responsive to the output signal of said detecting means and a direct current reference signal fed to said comparator supplied from a direct current source connected thereto to thereby maintain constant the quadrature component of the voltage across said capacitor being formed, and means connected to the output of said amplifier means for measuring the output voltage thereof which is proportional to the current through said capacitor being formed to thereby provide a direct reading of the capacitance of said capacitor.

4. Apparatus for continuously measuring the capacitance of a capacitor under measurement comprising an alternating current source having an output current substantially independent of a load created by the capacitor under measurement, amplifier means for controllably varying the current output of said power source connected in series therewith, a capacitor standard connecting said capacitor under measurement in series with said amplifier means and said power source to form a constant current generator for said capacitor under measurement, means for detecting the voltage component across said capacitor under measurement which is in phase with the voltage output of said amplifier means, a direct current source, feedback circuit means connected between said detecting means and said current varying means for maintaining said quadrature component of the voltage across said capacitor under measurement in response to the output signal from said detecting means and an independent direct current reference signal applied thereto supplied from a direct current source connected to said feedback means between said detecting means and said current varying means, and means for measuring the output voltage of said amplifier means which is proportional to the current through said capacitor under measurement to thereby provide a direct reading of the capacitance of said capacitor.

5. An apparatus for continuously measuring concurrently the capacitance and dissipation factor of a capacitor being electrolytically formed comprising an alternating current power source having an output current substantially independent of an impedance load created by the capacitor being formed, means for controllably varying the current output of said power source, means for connecting said power source to said capacitor, first means connected to the capacitor being formed for detecting the quadrature component of the voltage across said capacitor which is in phase with the current through said capacitor, a direct current source, feedback circuit means connected to the output of said first detecting means for comparing the output signal therefrom with an independent direct current reference signal supplied from a direct current source connected from said feedback circuit means and applying any error signal produced by comparing the two signals to said current varying means to maintain constant the quadrature component of the voltage across said capacitor, means connected to said current varying means for measuring the voltage output which is proportional to the current through said capacitor to thereby provide a direct reading of the capacitance thereof, second means connected to the capacitor being formed for detecting the portion of the voltage which is in phase with the current through said capacitor, means connected to said current varying means and said second detecting means for shifting the output voltage of said current varying means by 90° to correspond with the phase of the voltage in phase with the current through said capacitor, and means connected to and responsive to said second detecting means and said phase shift means for measuring the output thereof which is proportional to the dissipation factor.

References Cited by the Examiner
UNITED STATES PATENTS

| | | | |
|---|---|---|---|
| 2,735,064 | 2/1956 | Salzberg | 324—57 |
| 2,968,180 | 1/1961 | Schafer | 324—57 X |
| 3,026,474 | 3/1962 | Pihl | 324—60 |
| 3,031,614 | 4/1962 | Calvert | 324—57 |

WALTER L. CARLSON, *Primary Examiner.*

J. P. O'BRIEN, E. E. KUBASIEWIZ,
*Assistant Examiners.*